(12) United States Patent
Tullberg et al.

(10) Patent No.: US 11,595,351 B2
(45) Date of Patent: *Feb. 28, 2023

(54) MONITORING SYSTEM AND METHOD FOR CONNECTING A MONITORING DEVICE TO A SERVICE SERVER

(71) Applicant: Axis AB, Lund (SE)

(72) Inventors: Joacim Tullberg, Lund (SE); Johan Adolfsson, Lund (SE); Martin Gren, Lund (SE)

(73) Assignee: Axis AB, Lund (SE)

( * ) Notice: Subject to any disclaimer, the term of this patent is extended or adjusted under 35 U.S.C. 154(b) by 5 days.

This patent is subject to a terminal disclaimer.

(21) Appl. No.: 17/237,756

(22) Filed: Apr. 22, 2021

(65) Prior Publication Data

US 2021/0243154 A1 Aug. 5, 2021

Related U.S. Application Data

(63) Continuation of application No. 16/658,919, filed on Oct. 21, 2019, now Pat. No. 11,019,024, which is a
(Continued)

(30) Foreign Application Priority Data

Dec. 22, 2005 (EP) ..................................... 05112794

(51) Int. Cl.
*H04L 61/5014* (2022.01)
*H04L 41/0806* (2022.01)
(Continued)

(52) U.S. Cl.
CPC ...... *H04L 61/5014* (2022.05); *H04L 41/0809* (2013.01); *H04L 61/00* (2013.01);
(Continued)

(58) Field of Classification Search
None
See application file for complete search history.

(56) References Cited

U.S. PATENT DOCUMENTS

| 5,307,354 A | 4/1994 | Cramer et al. |
| 6,185,598 B1 | 2/2001 | Farber et al. |

(Continued)

FOREIGN PATENT DOCUMENTS

| JP | 2002-328856 A2 | 11/2002 |
| WO | 03/027906 A2 | 4/2003 |

(Continued)

OTHER PUBLICATIONS

Azagury et al., "A two layered approach for securing an object store network", Jan. 1, 2002, First International IEEE Security in Storage Workshop, 2002. Proceedings. (pp. 10-23) (Year: 2002).*

(Continued)

*Primary Examiner* — Davoud A Zand
(74) *Attorney, Agent, or Firm* — Volpe Koenig

(57) ABSTRACT

Methods for configuring a monitoring device to communicate with a service server are provided. The method includes the monitoring device sending a message including a code used for authentication of the monitoring device to a control server, receiving one or more addresses of a service server associated with the monitoring device from the control server in response to the monitoring device being authenticated by the control server, storing the one or more addresses retrieved by the control server, and establishing a connection between the monitoring device and the service server using at least one of the one or more addresses received from the control server.

20 Claims, 13 Drawing Sheets

Related U.S. Application Data continuation of application No. 15/882,594, filed on Jan. 29, 2018, now Pat. No. 10,476,840, which is a continuation of application No. 11/644,074, filed on Dec. 22, 2006, now Pat. No. 9,882,869.

(60) Provisional application No. 60/776,976, filed on Feb. 25, 2006.

(51) Int. Cl.
  *H04L 67/025* (2022.01)
  *H04L 67/125* (2022.01)
  *H04L 61/00* (2022.01)
  *H04L 67/51* (2022.01)
  *H04L 41/0853* (2022.01)
  *H04L 9/40* (2022.01)

(52) U.S. Cl.
  CPC .......... *H04L 67/025* (2013.01); *H04L 67/125* (2013.01); *H04L 67/51* (2022.05); *H04L 41/0856* (2013.01); *H04L 63/08* (2013.01)

(56) References Cited

U.S. PATENT DOCUMENTS

| | | |
|---|---|---|
| 6,353,848 B1 | 3/2002 | Morris |
| 6,515,970 B1 | 2/2003 | Lindsay et al. |
| 6,567,122 B1 | 5/2003 | Anderson et al. |
| 6,636,259 B1 | 10/2003 | Anderson et al. |
| 6,704,401 B2 | 3/2004 | Piepho et al. |
| 6,754,181 B1 | 6/2004 | Elliott et al. |
| 6,763,226 B1* | 7/2004 | McZeal, Jr. .......... H04M 1/7243 455/575.1 |
| 6,779,030 B1 | 8/2004 | Dugan et al. |
| 6,784,924 B2 | 8/2004 | Ward et al. |
| 6,812,962 B1 | 11/2004 | Fredlund et al. |
| 6,850,497 B1 | 2/2005 | Sigler et al. |
| 6,930,709 B1 | 8/2005 | Creamer et al. |
| 7,448,996 B2 | 11/2008 | Khanuja et al. |
| 7,463,648 B1 | 12/2008 | Eppstein et al. |
| 8,015,234 B2 | 9/2011 | Lum et al. |
| 2002/0026503 A1* | 2/2002 | Bendinelli .......... H04L 63/0272 709/223 |
| 2002/0083128 A1 | 6/2002 | Miyajima et al. |
| 2002/0149677 A1 | 10/2002 | Wright |
| 2002/0151294 A1* | 10/2002 | Kirby .................. H04L 12/1859 455/406 |
| 2002/0154330 A1 | 10/2002 | Carlton |
| 2003/0040974 A1 | 2/2003 | Chauvin |
| 2003/0135865 A1 | 7/2003 | Jung |
| 2003/0157960 A1 | 8/2003 | Kennedy |
| 2003/0187963 A1 | 10/2003 | Tsai |
| 2003/0191848 A1 | 10/2003 | Hesselink et al. |
| 2004/0028391 A1 | 2/2004 | Black et al. |
| 2004/0046868 A1 | 3/2004 | Anderson et al. |
| 2004/0109063 A1 | 6/2004 | Kusaka et al. |
| 2004/0116119 A1* | 6/2004 | Lewis .................. H04W 12/033 705/40 |
| 2004/0201682 A1 | 10/2004 | Chauvin et al. |
| 2005/0198227 A1 | 9/2005 | Nakama |
| 2005/0210342 A1 | 9/2005 | Schwagmann |
| 2005/0275720 A1* | 12/2005 | Noguchi .......... H04N 21/41407 348/E7.086 |
| 2006/0079999 A1 | 4/2006 | Husein |
| 2006/0114872 A1 | 6/2006 | Hamada |
| 2006/0126846 A1 | 6/2006 | Araki et al. |
| 2006/0148402 A1 | 7/2006 | Hagiwara |
| 2006/0155980 A1 | 7/2006 | Bodlaender |
| 2006/0173997 A1 | 8/2006 | Tullberg et al. |

FOREIGN PATENT DOCUMENTS

| | | |
|---|---|---|
| WO | 03/055248 A1 | 7/2003 |
| WO | 03/058969 A1 | 7/2003 |

OTHER PUBLICATIONS

Helander et al., "Secure Web services for low-cost devices", Jan. 1, 2005, IEEE, Eighth IEEE International Symposium on Object-Oriented Real-Time Distributed Computing (ISORC'05) (pp. 130-139) (Year: 2005).*

Peterson, "A Yellow-Pages Service for a Local-Area Network," 1998, 12 pages, Department of Computer Sciences, Univestiy of Arizona, See Also: Association of Computing Machinery XP-002061706.

* cited by examiner

MONITORING SYSTEM AND METHOD FOR CONNECTING A MONITORING DEVICE TO A SERVICE SERVER

CROSS REFERENCE TO RELATED APPLICATIONS

This application is a continuation of U.S. patent application Ser. No. 16/658,919, filed Oct. 21, 2019, which is a continuation of U.S. patent application Ser. No. 15/882,594, filed Jan. 29, 2018, which issued on Nov. 12, 2019 as U.S. Pat. No. 10,476,840, which is a continuation of U.S. patent application Ser. No. 11/644,074, filed Dec. 22, 2006, which issued on Jan. 30, 2018 as U.S. Pat. No. 9,882,869, which claims the benefit of U.S. Provisional Application No. 60/776,976 filed Feb. 25, 2006, which are incorporated by reference as if fully set forth.

FIELD OF INVENTION

The present invention relates to monitoring systems and devices of such a system. In particular the invention relates to a method for connecting a monitoring device to a service server and to a monitoring system enabling such connection.

BACKGROUND

Monitoring systems for monitoring of premises, areas of particular interest and/or processes connected via a computer network to monitoring or surveillance servers are increasingly popular, in particular such monitoring systems including digital monitoring cameras. One reason for the popularity of such systems may be that the systems in great extent may utilize an existing network, if a computer network already is in place.

Another reason for using a general computer network as a surveillance network may be that the network that has to be built for the monitoring system may be used to connect other types of equipment, e.g. computers, servers and peripherals. For these reasons the technology suits organizations/persons in need of only a single or few monitoring devices as well as organizations/persons in need of a great number of monitoring devices.

In one such monitoring system the monitoring devices are arranged to send their monitoring data to a service server which processes the monitoring data or information in order to prepare the data for access to monitoring data by a user, for logging monitoring information, for storing monitoring data, or for other purposes known to a person skilled in the art of monitoring systems.

In general the monitoring devices of such system are manufactured by one company and the service server is maintained by a monitoring service provider, being another company. The monitoring service provider may be a company or organization specialized in providing such services. The monitoring service provider may, however, also be a company related to the monitored premises, areas and/or processes, i.e. the company owning or operating at the monitored sites. In the systems of today each monitoring device may be provided with the address to a service server by the user keying the address directly into the monitoring device. Another method for achieving a connection between the monitoring device and a service server is to connect to the service server via a computer connected to the computer network and register the monitoring device at the service server.

Today, such programming of an address to a service provider or registration of a monitoring device in a service server is performed by the user of or a person installing the monitoring device during the process of installing the monitoring device.

Some general problems associated with the above described monitoring systems are that the person performing the installation may not be experienced in programming monitoring devices, the programming may be time consuming, the person may enter erroneous data into the monitoring device.

SUMMARY

One object of the present invention is to provide an improved monitoring system.

The object is achieved by means of a method for connecting a monitoring device to a service server and by means of a monitoring system, a control server, and a monitoring device. Embodiments of the invention are disclosed in the dependent claims.

In particular, according to a first aspect of the invention a method for connecting a monitoring device to a service server, comprises retrieving an address relating to a control server from a memory of the monitoring device, sending a connection message from the monitoring device to the address relating to a control server in response to a connecting event, extracting, at the control server, an identifier from the communication between the monitoring device and the control server, identifying, at the control server, a service server associated with the extracted identifier, sending an address relating to the identified service server from the control server to the monitoring device, sending a connection message from the monitoring device to the identified service server in response to the receipt of the address related to the identified service server, establishing a service connection between the monitoring device and the identified server.

According to a second aspect of the invention the monitoring system comprises a monitoring device, a control server, a plurality of service servers and a network connecting the servers and the monitoring device.

The monitoring device includes a memory including a connection address initiating means arranged to send a connection message over the network to the connection address in response to an initiation event, and means arranged to send a new connection message to an address received in a message via said network.

The control server includes an identity extractor arranged to extract an identifier from a communication between the monitoring device and the control server, matching means arranged to match the extracted identifier to a control server or a service server and retrieve an address to the matched service server, and a message generator arranged to generate a message including the retrieved address and to send the generated message to the monitoring device.

Each service server includes means for receiving and processing monitoring data from a monitoring device.

An advantage with the above described method and system is that the maintenance and installation of the device may be facilitated because of the monitoring device being guided to a preferred service server by a control server instead of requiring a person to key in the address to a preferred service server. Additionally, in this way the system may be more efficiently maintained, because the control server may be easier or more effective to keep updated with new or changing service server addresses than the user or the person maintaining the monitoring device.

A further advantage is that the monitoring device initiates all connections with the control server/servers and the service server/servers, which facilitate the integration of monitoring devices from behind access limiting devices, e.g. a firewall, a NAT (Network Address Translation), an ISP (Internet Service Provider) providing dynamic addresses, into a system reaching outside such access limiting devices.

According to another embodiment of the invention an initial retrieval of an address relating to a control server from a memory of the monitoring device in the above mentioned method returns a preconfigured address relating to a control server and wherein an initial sending of a connection message from the monitoring device to the preconfigured address is performed in response to an initiation event of the monitoring device.

The advantage of arranging an initial control server like this is that the installation and customization of monitoring devices of the system is facilitated. The installation is facilitated as a result of the initiation of the monitoring device automatically contacts a predetermined control server upon initiation of the monitoring device, thus no need to provide any addresses to the monitoring device during installation. The customization is facilitated because specific properties relating to the monitoring device may be provided by the control server upon initial communication between the monitoring device and the control server, i.e. the initial control server. Accordingly, the manufacturer of the monitoring device does not need to have different manufacturing processes for different batches of monitoring devices.

In other words the system according to this embodiment of the invention may solve problems of the manufacturer relating to customization of devices. For example, during manufacturing the monitoring devices of the monitoring systems of today have to be associated with different service providers and then each device associated with a service provider has to be programmed in a process that is customized for the associated service provider. Thus, the manufacturer has to provide a plurality of different manufacturing processes for devices intended for different service providers. More over the devices so programmed for a specific service provider have to be delivered and sold to the specific service provider or customers of the specific service provider.

Another advantage of this embodiment is that it enables central management of monitoring devices.

According to yet another embodiment the sending of a connection message from the monitoring device to a control server is performed at least one time prior to sending a connection message from the monitoring device to a control server which provides an address of a service server to the monitoring device.

The advantage of arranging a plurality of control servers and directing a monitoring device to another control server is that the responsibility of directing the monitoring device to a correct service server may be changed from an entity responsible of the general functionality of the system, e.g. the manufacturer of the monitoring device, to an entity responsible for providing the required service, e.g. the service provider.

According to a further embodiment the act of identifying a service server further includes the acts of extracting a network address relating to the monitoring device from the communication between the monitoring device and the control server, matching the network address to a service provider, and selecting a service server associated with the matched service provider.

By using the network address relating to the monitoring device in this way it may be easy to identify the service provider, at least in those cases the service provider providing the network connection is associated to a provider of a monitoring service or if those service providers are the same.

According to yet another embodiment the act of identifying a service server further includes the acts of extracting an identification code included by the monitoring device in the communication between the monitoring device and the control server, matching said identification code to a service provider, and selecting a service server associated with the matched service provider.

By using an identification code in this way the monitoring devices may be customized and connected to a specific monitoring service provider based on various criteria. For instance a batch of monitoring devices may be dedicated to a specific monitoring service provider offering a discount when buying the monitoring device with the reservation that the device will be connected to service servers of that monitoring service provider. Thus, the service provider get the identification codes registered in the control server as identification codes belonging to the service provider and is thereby able to ensure the connection of the monitoring device to the services of the service provider. Further, the batch of monitoring devices may be dedicated to a company having a service server of their own for the monitoring of their own premises.

In all the embodiments it is the monitoring device which sends the connection message to the control server or to the service server. The advantage of this is that the servers may be arranged to send control messages in the responses to the messages from the monitoring device, e.g. in the response to a http request. Thus the control server may exercise control over the monitoring device despite possible access hindering devices, e.g. firewalls, NAT servers, etc., arranged between the monitoring device and the server. Such a communication scheme is disclosed in WO 2006/073348, by Axis A B, Emdalavagen 14, S223 69 Lund, SE.

According to one embodiment the system includes a plurality of control servers including at least one initial control server, being a high level, or even a top level, control server in an hierarchy of control servers. Such initial control server is arranged to access address information enabling at least indirect connection to any control server and service server in the system.

By arranging the system like this it is possible to distribute responsibilities among the servers. For instance, the initial control server may be given an overall responsibility of directing a monitoring device to the correct subsystem of control servers and service servers, while a control server in such a subsystem may be given the responsibility to direct the monitoring device to the most suitable service server.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION

Figure 1:
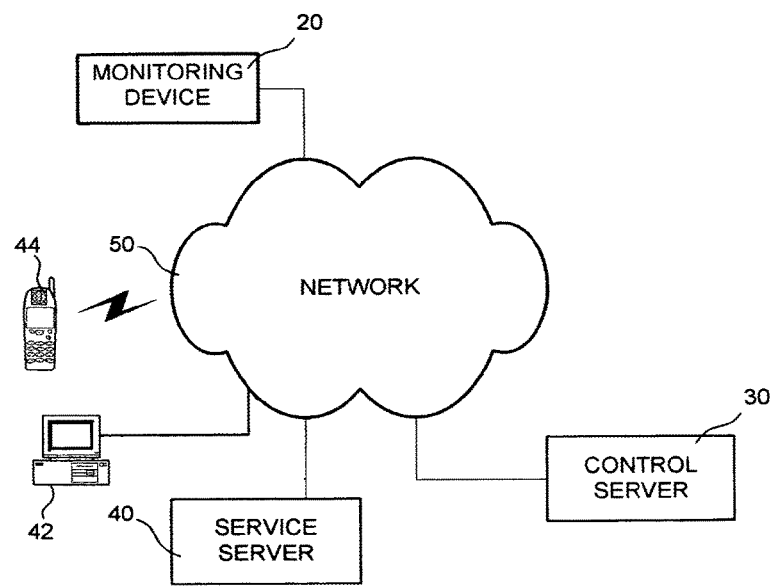
FIG. 1 is a schematic overview of a monitoring system according to the present invention.

In FIG. 1 an overview of a monitoring system 10 according to one embodiment of the invention is showed. The monitoring system 10 includes a monitoring device 20, a control server 30, a service server 40 and a user terminal in the form of a client computer 42 or a mobile telephone 44. The monitoring device 20, the control server 30, and the service server 40 are connected to each other via a computer network 50, such as Internet, a LAN (Local Area Network), a WAN, (Wide Area Network). The computer network 50 may include wireless and/or wired communication channels. The monitoring device 20 may be a digital camera, a motion detector, an audio detector, an IR-detector, a passage control device, an electronic door lock, an elevator control system, a card reader, etc. The user terminals 42,44 are connected to the network communicating with the service server for accessing a monitoring device or accessing monitoring service implemented on the service server.

Figure 2:
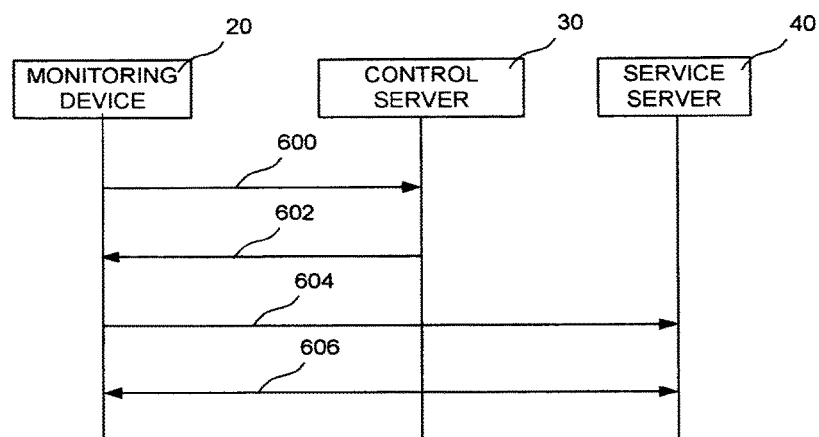
FIG. 2 is a schematic timing diagram over signaling in one embodiment of the invention.

In FIG. 2 a general signaling scheme between the different devices are schematically depicted. The specifics of the communication between devices may vary depending on the communication protocols used and the physical network. However, details regarding how to implement general communications via a network are known to persons skilled in the art of computer communications and are therefore not described herein. The monitoring device 20 is arranged to send a connection message 600 in response to an initiation action or an initiation event to an address stored within the monitoring device 20. The connection message is received at a control server 30 residing at said address. The control server 30 receives the connection message and the monitoring device 20 and the control server 30 establish a connection. The control server also extracts an identifier from the communication received from the monitoring device 20. The identifier is used to match the monitoring device to a service provider and a service server. When the control server 30 has found a match it sends an address in a message 602 to the monitoring device. The message is identified as a change of address message or a reconfiguration message at the monitoring device 20. In response to this message 602 the monitoring device 20 stores the new address and sends a connection message 600 or 604 to the new address. The address received from the control server 30 may address another control server 30 or a service server 40 depending on the structure of the system, this will be explained below.

When the address in the reconfiguration message 602 received at the monitoring device is associated with a service server 40 and, accordingly, the next connection message 604 sent from the monitoring device 20 is sent to a service server 40, the service server 40 and the monitoring device 20 then establish a service connection 606 enabling communication of monitoring data to the service server 40 and possibly, but not necessary, configuration parameters to the monitoring device. Thus, the monitoring device 20 has been connected to a server that is enabled to provide the monitoring services. The service server 40 to which the monitoring device 20 has been directed may then be the most suitable service server 40 in regard of geographic location, location in the network, available services, and/or customer specific reasons. Which one of these criteria that is applicable in regard of specific monitoring devices 20 may be controlled by the data provided to the control server 30 or control servers 30 directing the monitoring device 20 to the service server 40.

Figure 3A:
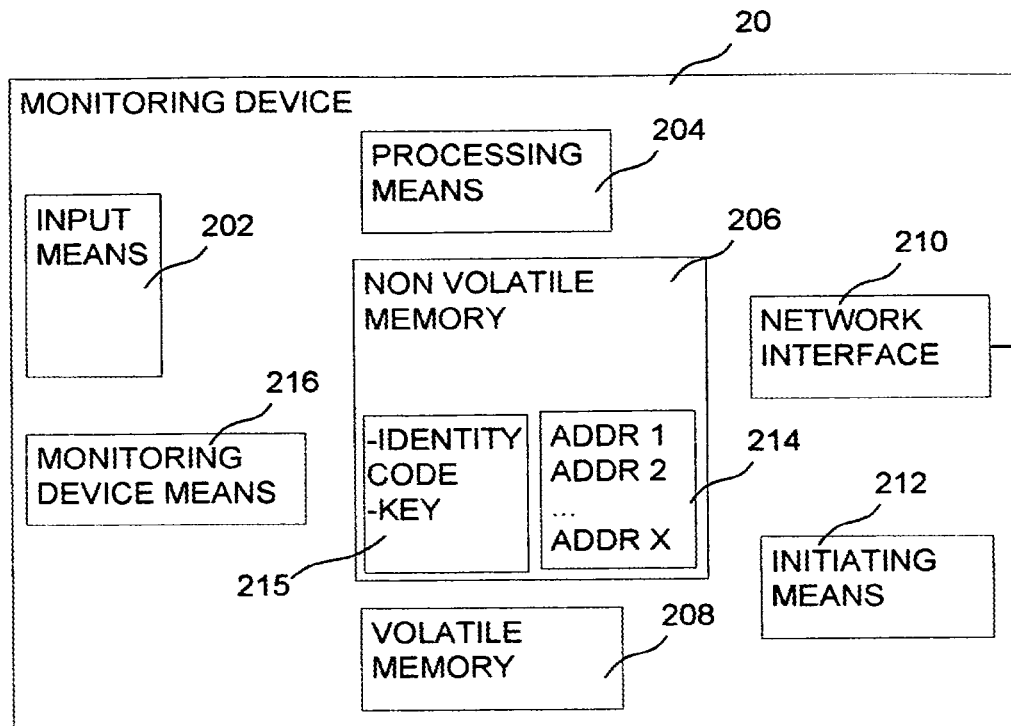
FIG. 3a is a schematic block diagram of a monitoring device according to one embodiment of the invention.
Figure 3B:
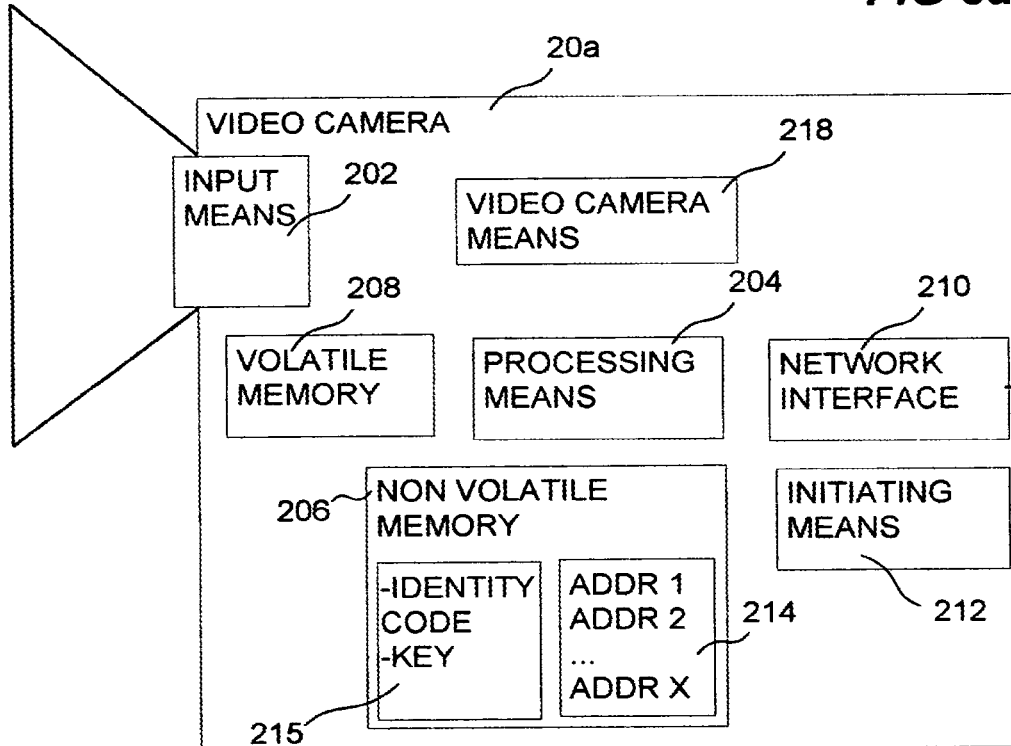
FIG. 3b is a schematic block diagram of a video camera acting as monitoring device according to one embodiment of the invention.

According to one embodiment the monitoring device 20 may include an input means 202, a processing means 204, a non-volatile memory 206, a volatile memory 208, a network interface 210, an initiating means 212, a monitoring device means 216 as shown in FIG. 3a and in FIG. 3b. FIG. 3a is a schematic view of a general monitoring device and FIG. 3b is a schematic view of a monitoring device 20 being a digital camera. In order to facilitate the understanding of the invention the FIGS. 3a and 3b do not show all means needed to make the device perform its normal functions, i.e. the means that makes an IR detector function as an IR detector or that makes a digital camera function as a digital camera. All means, such as hardware and software, required to make the monitoring device work as a monitoring device is indicated by the monitoring device means 216 in FIG. 3a. In FIG. 3b the corresponding means of the camera is referred to as video camera means 218. The means and arrangements required for making an ordinary monitoring device network enabled are known to a skilled person. An example of such network enabled monitoring devices on the market today are the networked digital cameras from Axis Communications AB, Emdalavagen 14, S-223 69 Lund, Sweden.

As described above the monitoring device 20 may be any type of a plurality of types of devices and the input means 202 of the monitoring device 20 is different in different types of monitoring devices. For instance, the input means 202 of the digital camera 20a in FIG. 3b may be an image sensor, e.g. a CCD, the input means of an audio detector may be a microphone, etc. The main function of the input means 202 is to detect, sample or measure the properties monitored by the monitoring device 20 and provide such data to the processing means 204 for further processing.

The processing means 204 is arranged to control the functionality of the monitoring device and execute program code related to the functions of the present invention and general functions of the monitoring device 20. The non-volatile memory 206 may be used by the monitoring device 20 for storing data and information relating to the functionality of the monitoring device and its interaction with the monitoring system. In particular, according to one embodiment of the invention, a list 214 of addresses to servers on the network is stored in the non-volatile memory. The list 214 of addresses may be prioritized by marking each address entry with a priority marker. The markers may be numbers identifying the priority. The list 214 of addresses in a monitoring device shipped from the manufacturer includes at least one preprogrammed address to a control server 30, this server is generally referred to as initial control server in this application. The list 214 may include a plurality of addresses wherein the address marked as having the highest priority is the first address the monitoring device will send a connection message to in response to a connection event. In case that the first address fails the next address in the prioritized list is tried and a connection message is sent to that one as well. According to another embodiment the next address tried in the list 214, in case of the first address failing, is randomly selected, which may result in load distribution in the network in case of many devices being equipped with identical lists and trying to connect to a faulty address essentially simultaneously.

The non-volatile memory may also comprise an identity code uniquely identifying the monitoring device and a unique key for encryption. The identity code may be used to identify the monitoring device at a control server or a service server. The unique key may be used for authenticating the camera as being the camera stated by the identity code.

The volatile memory 208 may be used to support the processing means 204 and/or to temporarily store addresses received from control servers. Accordingly, the volatile memory 208 may also be a memory used by the applications executed on the monitoring device 20 by the processing means 204.

The network interface 210 is the interface between the monitoring device 20 and the network 50. Hardware and software that may be used to implement the network interface 210 for a number of different networks are well known by the person skilled in the art of computer networks.

The initiation means 212 is a means generating an initiation event and thereby triggering the sending of the initial connection message to the prioritized address stored in the non-volatile memory 206. According to one embodiment the initiation means 212 is a detector enabled to detect the connection of the monitoring device 20 to a network 50, i.e. either the connecting of a powered monitoring device 20 to a network 50 or the powering up of a monitoring device 20 already physically connected to a network 20. By arranging such an initiation means 212 the searching and connecting to a suitable service server 40 may be fully automated. According to another embodiment the initiation means 212 may be a power on button of the monitoring device 20 or it may be a button dedicated for the initiation of the connecting of the monitoring device 20 to a service server 40.

Means 218 arranged to send a connection message to a control server 30 or a service server 40 in response to a message including an address to such a server or a reconfiguration message including an address to such a server may be implemented by program code executed by the processing means 204.

Returning to the unique key stored in the non-volatile memory 206, it may also be used for encrypting messages to be sent or for decrypting received messages.

Further the key may be utilized to authenticate the camera during the setup of a connection resulting in an open path as described in WO 2006/073348, by Axis A B, Emdalavagen 14, S223 69 Lund, SE. The control server and the service server may also be provided with a key in order to be able to decrypt messages from the monitoring device, to encrypt messages sent to the monitoring device and to authenticate the monitoring device. Thereby all communication between the monitoring device and the control server and/or the service server may be encrypted. Preferably there is provided a unique key for each monitoring device produced and the key may be stored in the monitoring device during manufacturing of the device. The keys may be keys of a shared secret system or a public key system.

According to one embodiment a very large list of different keys are generated before the manufacturing of the cameras which are to be provided with these keys. The list should be of such a size that no new list has to be generated for years. Each control server is provided with the list of keys and during the manufacturing of a monitoring device the device will be provided with one of the keys. By providing the keys in this way there is no need for distribution of keys, which may be a safety hazard. Accordingly, authentication of monitoring devices and the distribution of keys may be simplified.

Figure 4A:
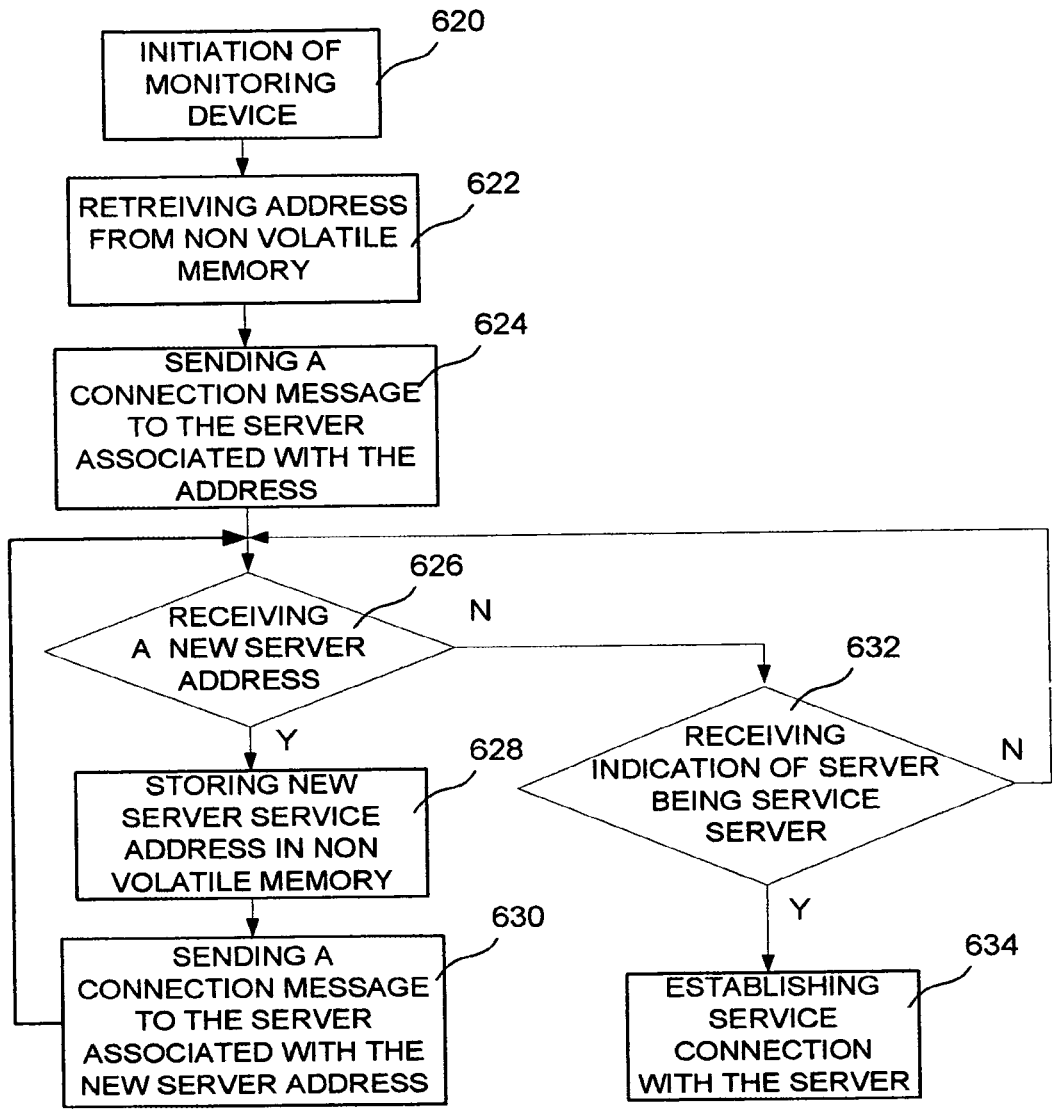
FIG. 4a is a schematic flowchart of the process of a monitoring device according to one embodiment of the invention.

The process of the monitoring device 20 finding a service server 40, according to one embodiment, is illustrated in FIG. 4a. Initially the monitoring device 20, which is either offline or shut off, is initiated, i.e. connected to the network, powered up, or initiated in any other way described above, step 620.

The monitoring device 20 then retrieves the first address from the prioritized list in the non-volatile memory 206, step 622. This address may be the address stored by the manufacturer during the manufacturing process. However, if the monitoring device 20 has been previously connected to a system according to the invention the address may be an address stored in response to a reconfiguration message or another message including an address to a more suitable server than the server of the address provided in the monitoring device 20 during manufacturing of the device.

Then the monitoring device sends a connection message via the network interface 210 to a server associated with the retrieved address, step 624.

After the connection message has been sent the monitoring device waits for a response from the server that received the connection message.

If, in step 626, the response is a message including an address to a new server or if the response is a reconfiguration message including an address to a new server, the monitoring device stores this address in the non-volatile memory 206, step 628. The address may be stored as the most prioritized in the list 214. The response message or reconfiguration message from the server may, according to one specific embodiment, include an entirely new list of server addresses replacing the present list in the non-volatile memory 206 or a subset of addresses substituting some of the addresses in the present list.

Then the monitoring device sends a new connection message, step 630, to the new server address, or the first address in the prioritized list after the list has been changed in step 628, in response to the received message. Then the monitoring device 20 once more waits for a response from the server to which the connection message was sent.

If, in step 626, no new server address is identified in the response message the monitoring device 20 check if the response includes an indication of the server being a service server 40 in itself, step 632. If the response includes such an indication the monitoring device 20 and the service server establish a service connection, step 634.

If the response does not include an indication of the server being a service server then the monitoring device may wait for another message from the server. In another embodiment the monitoring device sends a connection message to another address in the list directly when a response message is determined not to identify the server as a service server or not to identify a new server address. In another embodiment such a connection message is sent to another address in the list after a counter or timer indicate that the server or the address is likely to be erroneous. Said another address may be the next address in a prioritized list or a random selection in the list, as described earlier.

Figure 4B:
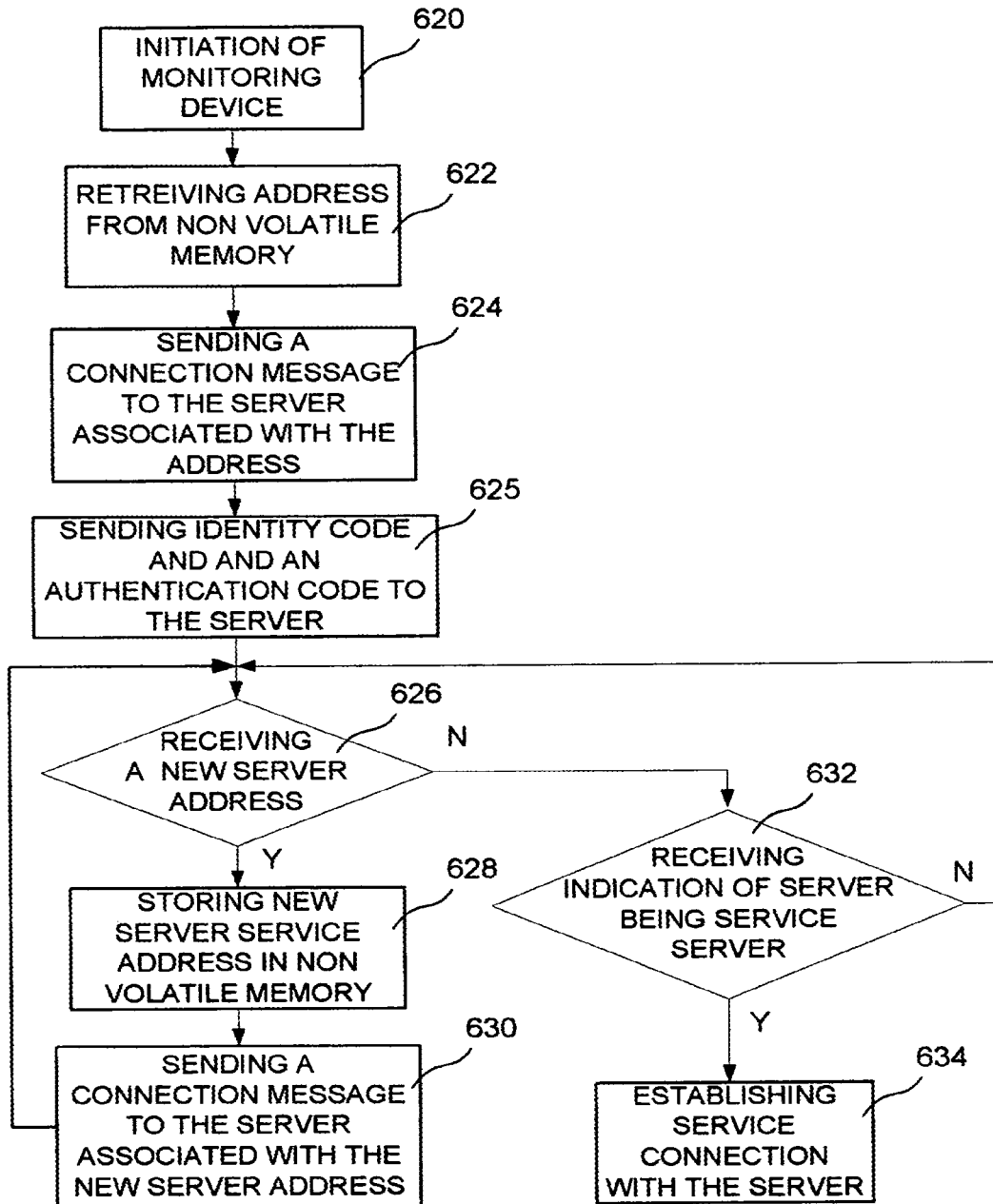
FIG. 4b is a schematic flowchart of the process of a monitoring device according to another embodiment of the invention.

In another embodiment, illustrated in FIG. 4b, the step 622 of retrieving a server address from the non-volatile memory monitoring device additionally includes retrieving an identity code and an authentication code. The identity code being an identifier uniquely identifying the monitoring device, e.g. such as a serial number, a product code combined with an item specific code, etc. The authentication code may be a code encrypted by means of the key stored in the volatile memory 206. The identifier and the authentication code is then sent, step 625, to the server 30 of the retrieved address either in the connection message, step 624, or in a later communication with the server 30. Moreover, the response from the control server including the new server address may also include a second authentication code, which may be used for authentication of the monitoring device when connecting to a service server. The authentication code may be an encryption/decryption key generated by the control server. The purpose of this second authentication code is to avoid distributing the main authentication code or key because such distribution might tamper the secrecy of the code.

Figure 5:
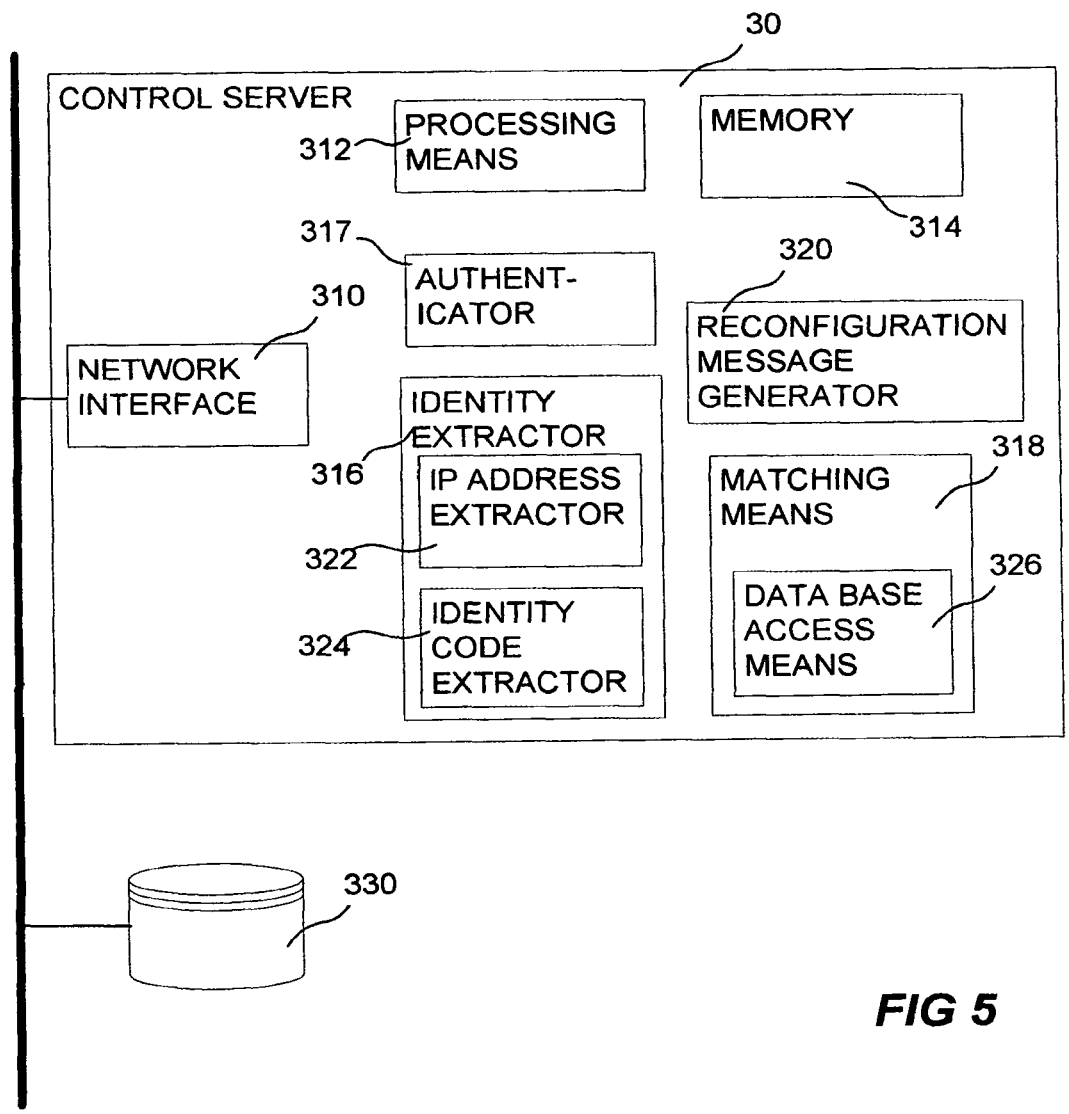
FIG. 5 is a schematic block diagram of a control server according to one aspect of the invention.

In FIG. 5 one embodiment of the control server 30 is schematically illustrated. The automatic connection set up by the monitoring device 20 is analyzed in the control server and the control server 30 provide the monitoring device 20 with an address to a new server, being the most relevant based on the information of other servers available to the control server 30 and the information provided in the communication with the monitoring device 20. The control server 30 includes a network interface 310 in order to provide network communications, a processing means 312 for operation of the control server 30, a memory 314 for supporting and storing application programs executed by the processing means 312, an identity extractor 316 for extracting an identifier of a monitoring device from the communication between the monitoring device 20 and the control server 30, an authenticator 317 for authenticating the identity code of the monitoring device 20, matching means 318 for matching the identity code to a server and a reconfiguration message generator 320 for generating and sending an address associated to a server matched to the extracted identifier.

The identity extractor 316 may be arranged to extract an identifier from the communication between the control server 30 and a monitoring device by extracting the address of the monitoring device connecting to the control server 30, the address may for instance be the IP-address of the monitoring device 20. The IP-address may be used for identifying the operator of the network in which the monitoring device is connected. This is possible because each operator has assigned series of IP-addresses. The extraction is performed by an IP-address 322 extractor which may be arranged to pinpoint the response address included in the message originating from the monitoring device 20. According to another embodiment the identity extractor 316 includes an identity code extractor 324 arranged to extract an identity code and an authentication code sent by the monitoring device 20 in the communication between the control server 30 and the monitoring device 20. In one embodiment the control server 30 includes both the IP-address extractor 322 and the identity code extractor 324 and may use them in accordance with different schemes, e.g. the identity extractor may start to extract and test if the IP-address is associated to a server in a database 330 and if not continue with an identity code check or the identity extractor may be arranged to start to extract and test the identity code and then the IP-address.

The matching means 318 makes use of the identifier extracted by the identity extractor 316 to find the most suitable server for the monitoring device. The matching means 318 is arranged to match the identifier of the monitoring device to a server by accessing a list or database 330 of identifiers and associated servers. The access of the list or database is performed by means of a data base access means 326. The list or database 330 used for matching may be arranged in the server, as a peripheral to the server, or it may be arranged for access via the network, the later embodiment is depicted in FIG. 5. The list or database 330 may, according to one embodiment, include entries of identifiers and each identifier being associated with at least one control server or service server. The list or database 330 may also include a key associated with each identifier for authenticating the monitoring device 20. Additional arrangements of the list or database 330 is known to the skilled person.

The database 330 or list including the entries of identifiers, keys and information associating an identifier and a key of a monitoring device 20 to a control server or a service server may be edited by accessing the list or database 330. The database 330 or the list may require authorization in order to allow someone to edit. Such editing of the list or database 330 may be performed in many different ways. For example, the editing may be performed in connection with the production of the monitoring device, in such case the identity code of the monitoring device is entered and associated with a predetermined service provider or server of a service provider, the editing may be performed by the service provider entering an identity code of a monitoring device that are to be associated to one or a set of their servers, the editing may be performed by the service provider entering IP addresses of their network and associates these to one of or a set of their servers, etc.

Figure 6A:
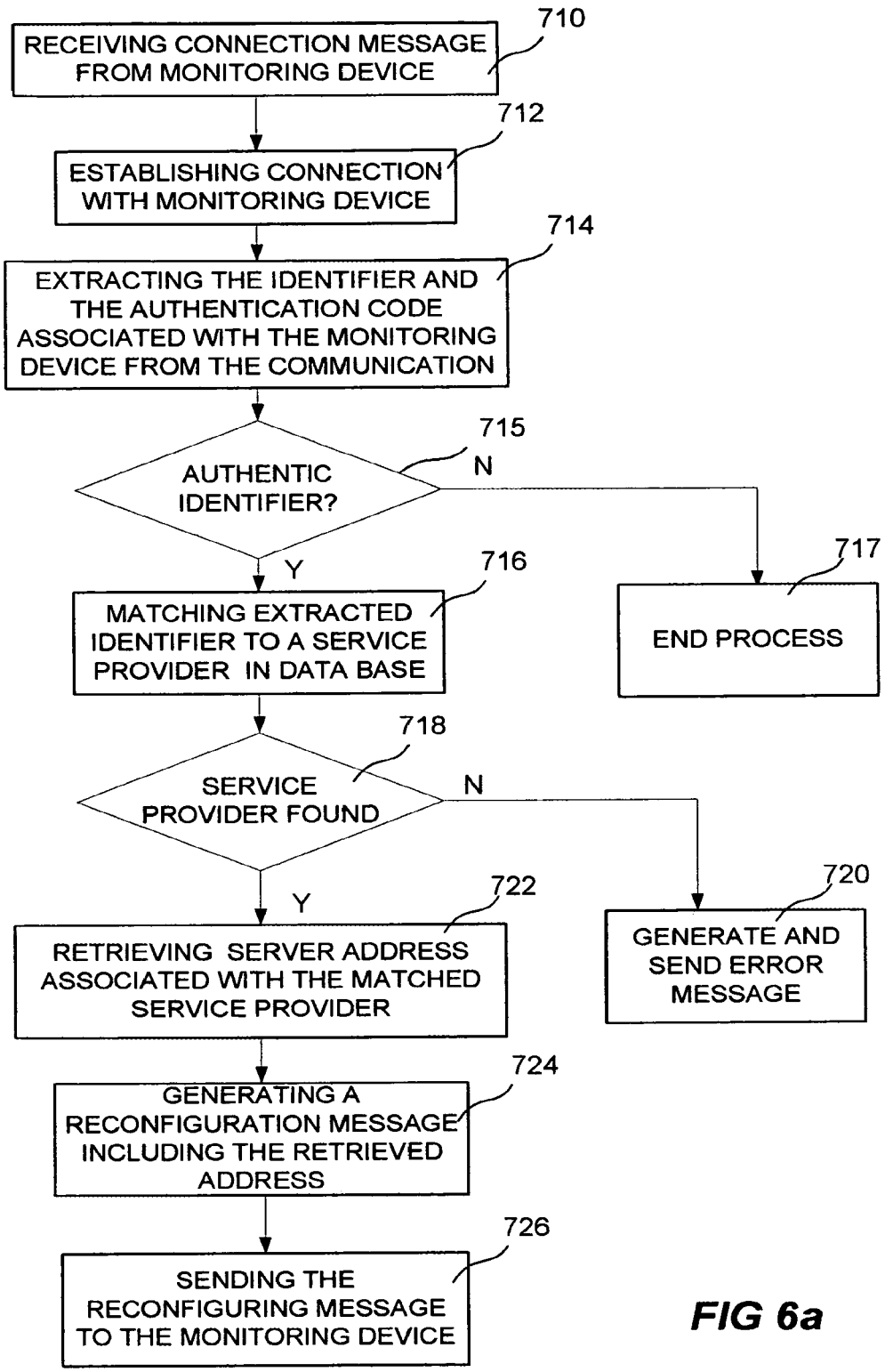
FIG. 6a is a schematic flowchart of the process of a control server according to one embodiment of the invention.

One embodiment of the process of the control server 30 serving the monitoring device is showed in FIG. 6a. The control server 30 receives a connection message from a monitoring device 20, step 710, via the network and the network interface 310. The monitoring device 20 and the control server 30 establishes a connection for communication, step 712. Then the identity extractor 316 of the control server 30 extracts the identifier and the authentication code associated with the monitoring device from the communication, step 714. The authenticity of the identifier is then checked by means of the authentication code, step 715. If the authentication fails, the process is ended, step 717. Otherwise the identifier is processed by the matching means 318, which matches the identifier to, in this particular embodiment, a service provider, step 716.

If, step 718, no service provider is matched to the identifier then the control server 30 may generate an error message, step 720, and return this message to the monitoring device 20 in a response to the connection message. The monitoring device 20 may be arranged to display a specific error code or activate some LED, Light Emitting Diode, indicating the type of error.

If such an error occurs, the user may inform the support of the monitoring device or the service provider, depending on which of the parties who is to provide support, and they may enter a correct address associated to the monitoring device 20 or the IP address of the monitoring device 20, enter the identifier of the monitoring device in the database and associate it to a server, etc.

If, step 718, a service provider is matched to the identifier then the matching means 318 retrieves an address to a server of that service provider, step 722.

The retrieved server address is then passed to the reconfiguration message generator 320, which generates a reconfiguration message or another type of message, step 724, including the retrieved server address. Then the reconfiguring message is sent, step 726, to the monitoring device 20 and the monitoring device acts on the reconfiguring message as described above in connection with FIGS. 3-4. The control server 30 may also generate a second authentication code for sending to the monitoring device 20, this authentication code may be sent to the monitoring device 20 in step 726 in connection with the reconfiguration message. The second authentication code may be used for authentication of the monitoring device when connecting to a service server. The authentication code may be an encryption/decryption key generated by the control server. The purpose of this second authentication code is to avoid distributing the main authentication code or key because such distribution might tamper the secrecy of the code.

The process described in FIG. 6a may advantageously be implemented in an initial control server, i.e. the type of control server addressed by the addresses arranged in the monitoring device during manufacturing of the monitoring device. Such a control server may be controlled by the manufacturer of the monitoring device and may present the benefit of making it possible for the manufacturer to configure large series of monitoring devices using identical processes, programs and properties, independent of who will buy the device or which service provider that are to be related to the monitoring device. The programs and properties of monitoring devices may be automatically changed when connecting to the control server 30 for the first time in order to customize in accordance with specific requests from service providers or other parties related to the device. Such automatic changes are delivered to the monitoring device 20 in a reconfiguration message.

Figure 6B:
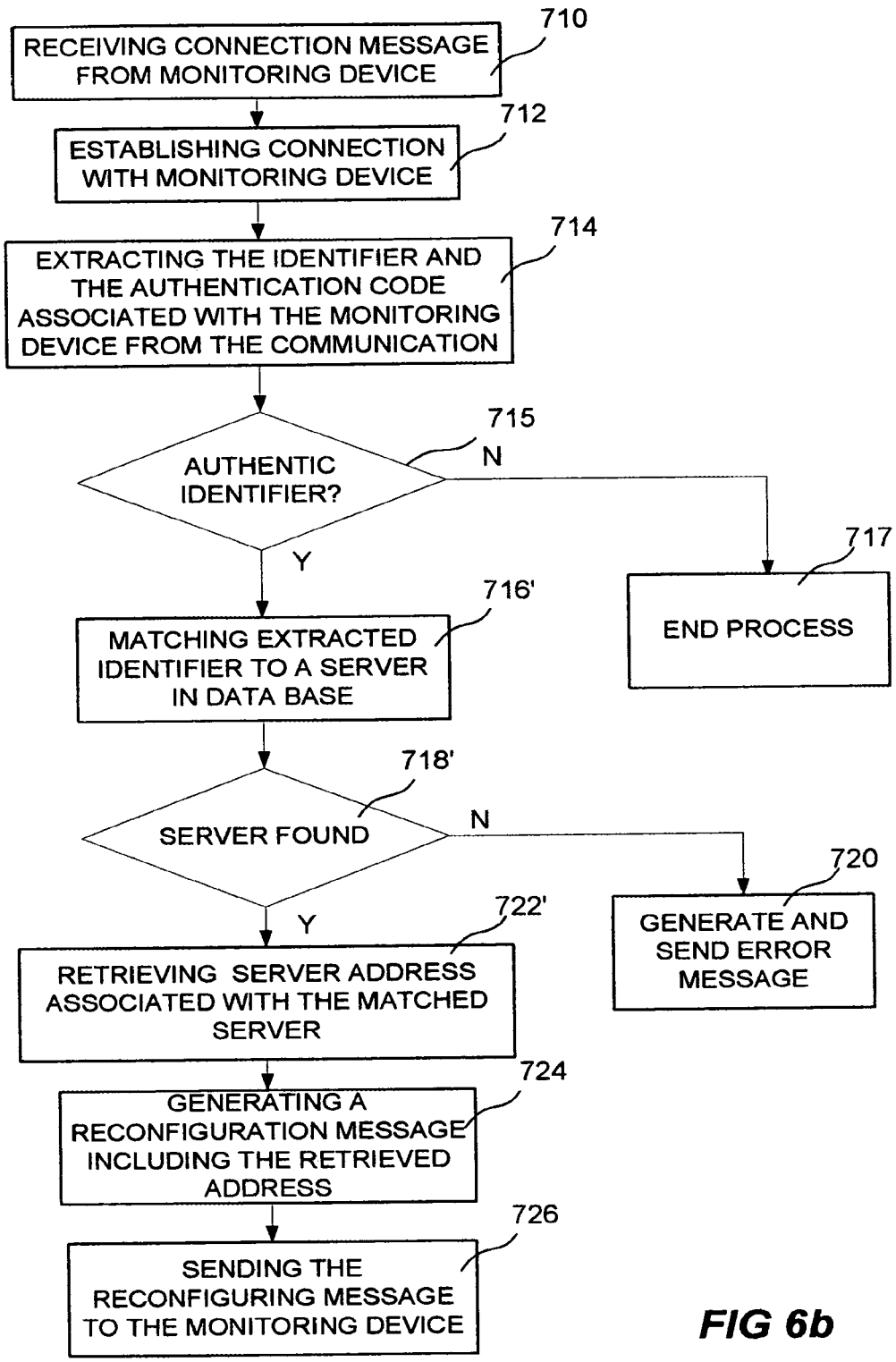
FIG. 6b is a schematic flowchart of the process of a control server according to another embodiment of the invention.

Another embodiment of the process of a control server may be as showed in FIG. 6b, the process is similar to the process of the embodiment in FIG. 6a and therefore the same reference numerals are used for the steps that are identical with the process of FIG. 6a. The steps that differs also uses the same reference numerals, but are marked with a the symbol ' after the number. Accordingly, the differences are generally that the process of FIG. 6b does not match a server by first matching a service provider, but the server is directly matched to the identifier. Accordingly, the extracted identifier is matched to a server in the data base, step 718', and if a server is found, step 718', the server address associated with the matched server is retrieved, step 722'. The rest of the process is identical to the process in FIG. 6a.

A control server 30 like the one described in connection with FIGS. 5, 6a and 6b may be used as an initial control server 30. Moreover, such a control server 30 may be useful as a later stage control server 30, i.e. a control server 30 arranged in a subsystem or a control server 30 of a service provider that the initial control server 30 may provide the address to if not all the service server addresses of a service provider are stored in the database 330 utilized by the initial control server 30. In this way different parties may manage different sets of servers in accordance with their objectives. For example, if the manufacturer of the monitoring devices manages a set of initial control servers and the service providers manages service servers and possibly some control servers, the manufacturer only is required to keep track of the service providers and a subset of the servers of the service providers, while the service providers are allowed to set up their service servers as they wish without having to consider changes to the database and control server of the manufacturer.

The service server 40 in the system may be seen as a server providing a user interface between the monitoring device 20 and user terminals. The service server 40 is arranged to provide a service connection to the monitoring device for transfer of the monitoring data to the service server. Additionally, the service server may be arranged to process the data received from the monitoring device 20 in order to present it or make it possible for a client of a user to present. The service server 40 may also be arranged to control the monitoring device. The service server may, for example, be a server including communication means for communicating with a monitoring device and for communicating with a user terminal, such as a client computer, mobile telephone, etc. Further, the service server may include authorization means in order to only connect authorized users to the monitoring device. The authorization may be implemented as a standard user name and password login. The user name and password may initially be provided together with the monitoring device upon delivery. Moreover the service server may include a database storing the monitoring information from the monitoring devices. Such monitoring devices may be video sequences from a camera, events relating to triggering of alarms, e.g. from an IR-detector or a sensor in a door. The service server may also be arranged to pass on substantially live video streams from cameras to user terminals upon request and authorization from the user terminal.

In order to accomplish sending of control parameters, data, updates, etc., even to monitoring devices arranged behind access limiting devices, e.g. a firewall, a NAT (Network Address Translation), an ISP (Internet Service Provider) providing dynamic addresses, the service server 40 may be arranged to send such information in responses to requests sent from the monitoring device. This, is easily accomplished as the monitoring device 20 is arranged to initiate the communications.

Figure 7:
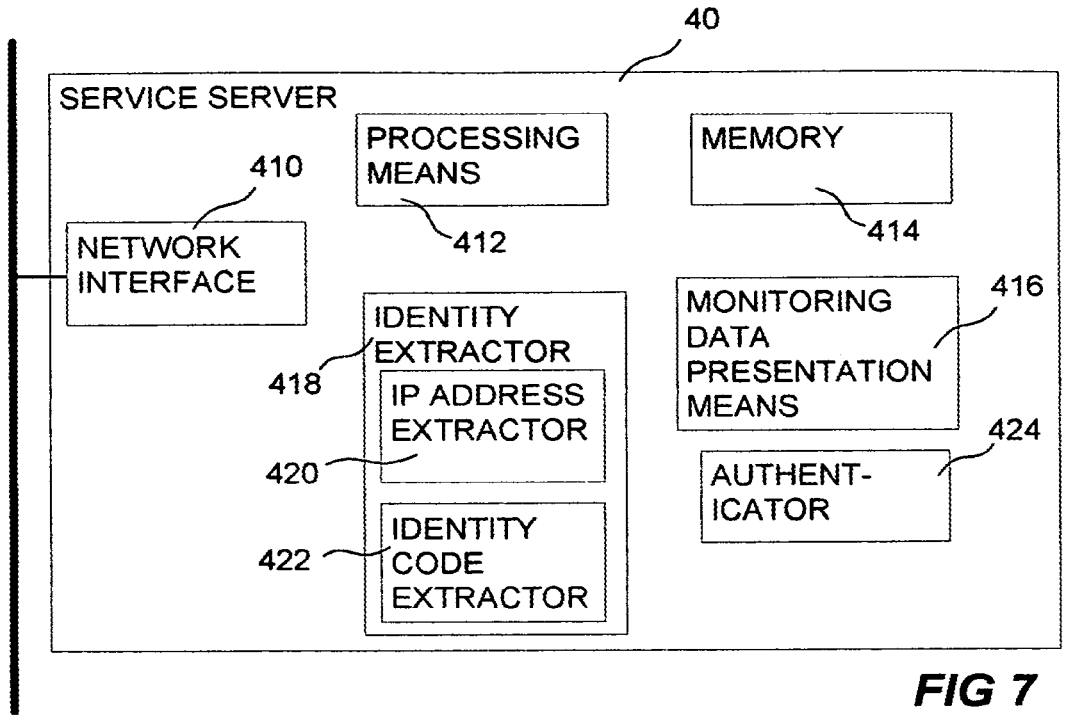
FIG. 7 is a schematic block diagram of a service server according to one embodiment of the invention.

In one embodiment the service server, see FIG. 7, includes a network interface 410 for enabling communication with monitoring devices over the network 50, processing means 412 for execution of applications on the service server, a memory 414 to store applications data, and a monitoring data presentation means 416. The service server may also include an identity extractor 418 for extracting an identifier of a monitoring device from the communication between the monitoring device 20 and the service server 40, an authenticator 324 for authenticating the identity code of the monitoring device 20, the authentication code used for authentication in the service server may be said second authentication code. The identity extractor may further include an IP-address extractor 420 and/or an identity code extractor 422 having the same functionality as in the control server 30. The monitoring data presentation means 416 comprises one or a plurality of applications for enabling presentation of monitoring data from one or a plurality of monitoring devices. Service servers providing the possibility to receive monitoring data, process the data and present the data for users are known to persons skilled in the art. An example of an possible service server 40 is found in WO 2006/073348, by Axis A B, Emdalavagen 14, S223 69 Lund, SE. This application also describes a method for communicating through access limiting devices.

Figure 8:
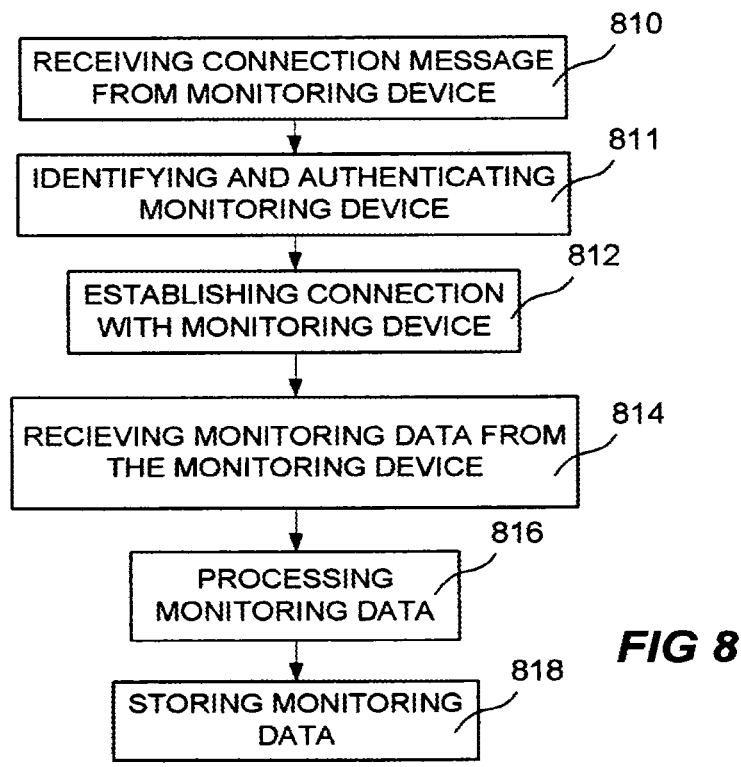
FIG. 8 is a schematic flowchart of the process of a service server according to one embodiment of the invention.

One embodiment of the process relating to the invention of the service server is shown in FIG. 8. The service server 40 receives a connection message from a monitoring device 20, step 810, and identifies and authenticates the monitoring device, step 811. Then the service server and the monitoring device establishes a service connection, step 812. When the service connection is established the service server 40 may start receiving monitoring data from the monitoring device, step 814, and processing, step 816, the received monitoring data in accordance with the requirements of the service server 40 or the desires of the final user. Then the service server 40 may store the monitoring data, step 818, for presentation for a client of a user or for download to a client or a server of the user. A client may be a workstation computer, a desktop computer, a laptop computer, a handheld computer, e.g. a PDA (Personal digital Assistant), a mobile telephone, etc.

The system for connecting a monitoring device to a service server may include a plurality of monitoring devices 20, a plurality of control servers and a plurality of service servers. The monitoring devices may be connected to the network 50 directly, via another network, via an access limiting device, etc.

Figure 9:
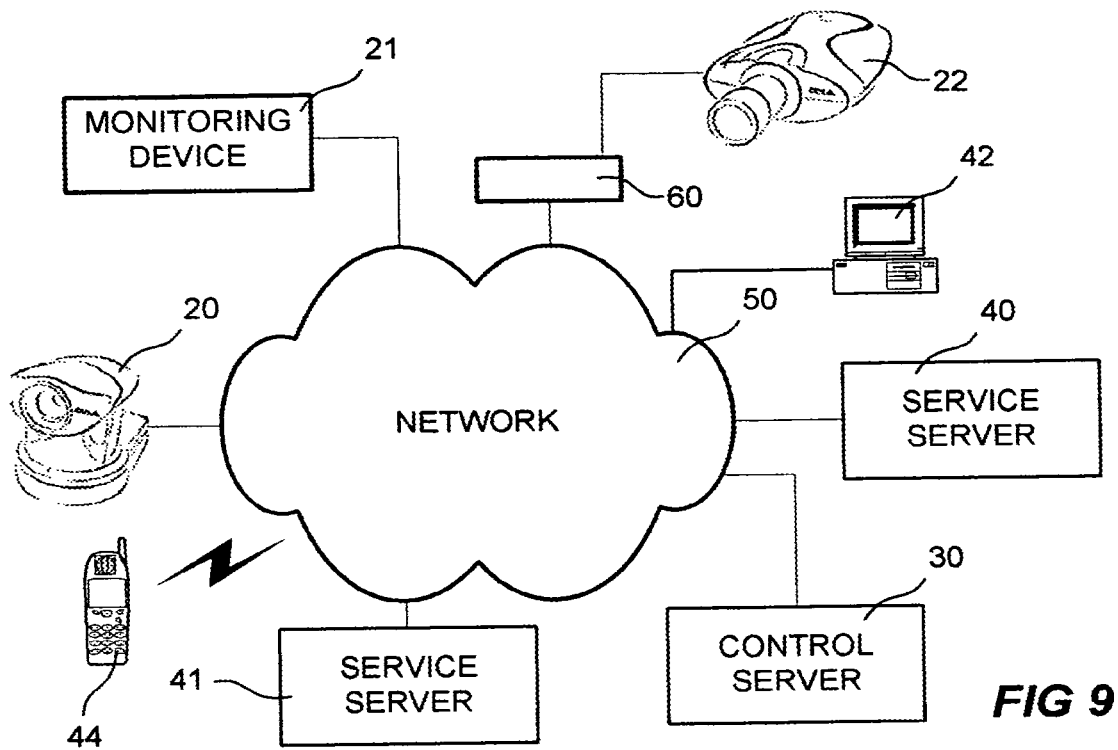
FIG. 9 is a schematic diagram over one configuration of a monitoring system according to the present invention.

In FIG. 9 one example of a system including three monitoring devices 20-22 and two service servers 40-41 and user terminals 42 and 44. In this example two of the monitoring devices are depicted as monitoring cameras, by using two visually differently looking figures of cameras and one general box indicating a monitoring device we want to emphasize that the monitoring devices in the system are not necessarily identical in regard of brand, type or even monitoring function, i.e. the monitoring system may include an IR detector, a wide angle camera, a low resolution camera, simultaneously. The numbers of monitoring devices 20-22 in the example illustrated by FIG. 9 may easily be increased as well as the number of service servers 40-41. Additionally, the example system includes one control server 30, which may be a manufacturer controlled control server.

Further, one of the monitoring devices 22 is connected to the network via a access limiting device 60, e.g. a firewall, a NAT (Network Address Translation) server, an ISP (Internet Service Provider) providing dynamic addresses, firewall. Such an access limiting device are not limiting the access of the monitoring device from the servers because they are arranged to send information or instructions to monitoring devices in a way passing through such devices, e.g. by means of providing the information or instructions in responses to messages or requests from the monitoring device. In the example, the database accessed by the control server 30 during the process of matching each of the monitoring devices to a server may include information associating the IP-address of the monitoring device 20 to the service server 40, based on the fact that the IP-address of monitoring device 20 is an IP-address of an internet access provider providing the service server 40. Additionally or alternatively, the database may include information associating an identity code sent from each of the monitoring devices 21 and 22 with the service server 41. Accordingly, the control server 30 may send the address of service server 40 to monitoring device 20 and the address of service server 41 to monitoring devices 21 and 22 in response to the connection messages sent by each of the monitoring devices, if the database of the control server include information associating the monitoring devices 20-22 to those service servers. As discussed earlier, the addresses received at the monitoring devices may be stored in non-volatile memory in order to be used during a future initiation. For example if monitoring device 20 is disconnected and reconnected again the address of service server 40 may be stored in non-volatile memory and the monitoring device may send the connection message directly to service server 40 instead of sending it to the control server 30. The user terminals 42 and 44 are arranged to communicate with the service server via the network in order to get monitoring information or image sequences from the camera or to control the monitoring device. In cases where the monitoring device is connected to the network via a access limiting device, such as a fire wall, the monitoring device has to be accessed via a server such as the service server 40.

Figure 10:
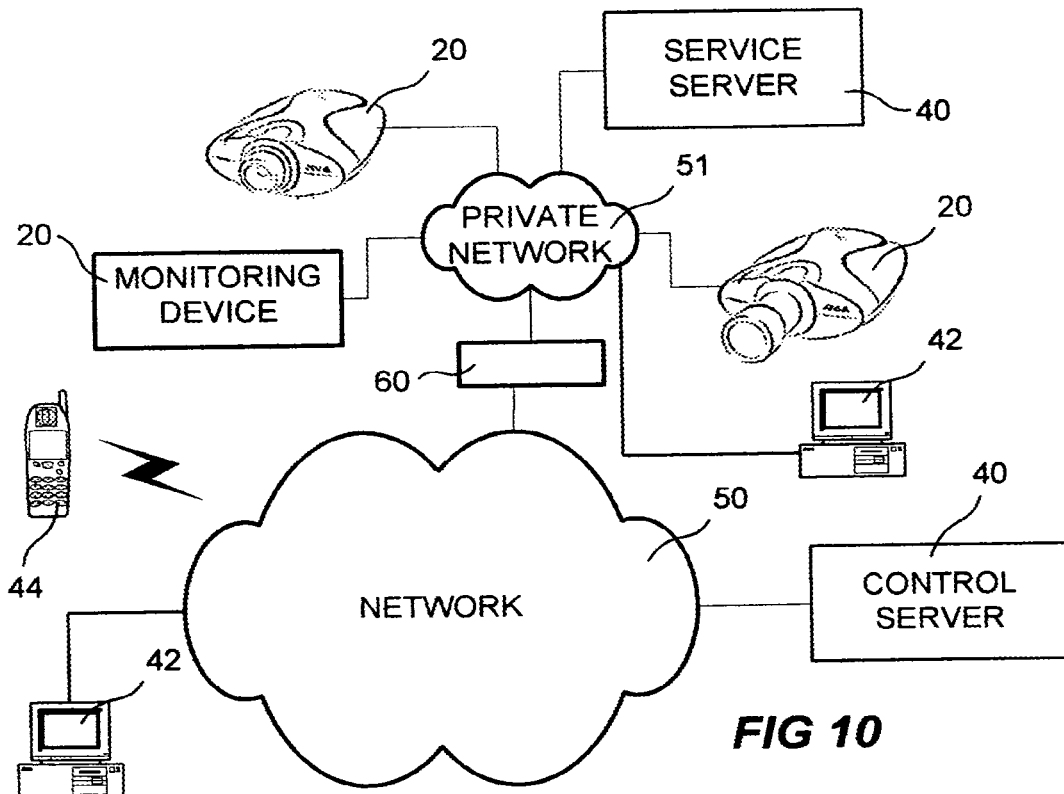
FIG. 10 is a schematic diagram over another configuration of a monitoring system according to the present invention.

In FIG. 10, yet another possible configuration is presented. In this case we may assume that a company requiring a lot of monitoring devices 20 for monitoring their premises, all connected to a protected 60 private network 51, also connect a service server directly to the private network 51. User terminal 42 and 44 are connected to the service server for accessing the monitoring services provided and/or for accessing the monitoring devices of the user. When buying the monitoring devices 20 they may get the serial numbers of the cameras registered in the control server and associated to the address of the internal service server of the company, the control server may be an initial control server. In this way the installation of the cameras are greatly simplified because the monitoring devices 20 only have to be mounted and connected to the private network 51 then the monitoring devices 20 automatically finds and reconfigures to connect to the intended service server 40 by means of the control server 30.

Figure 11:
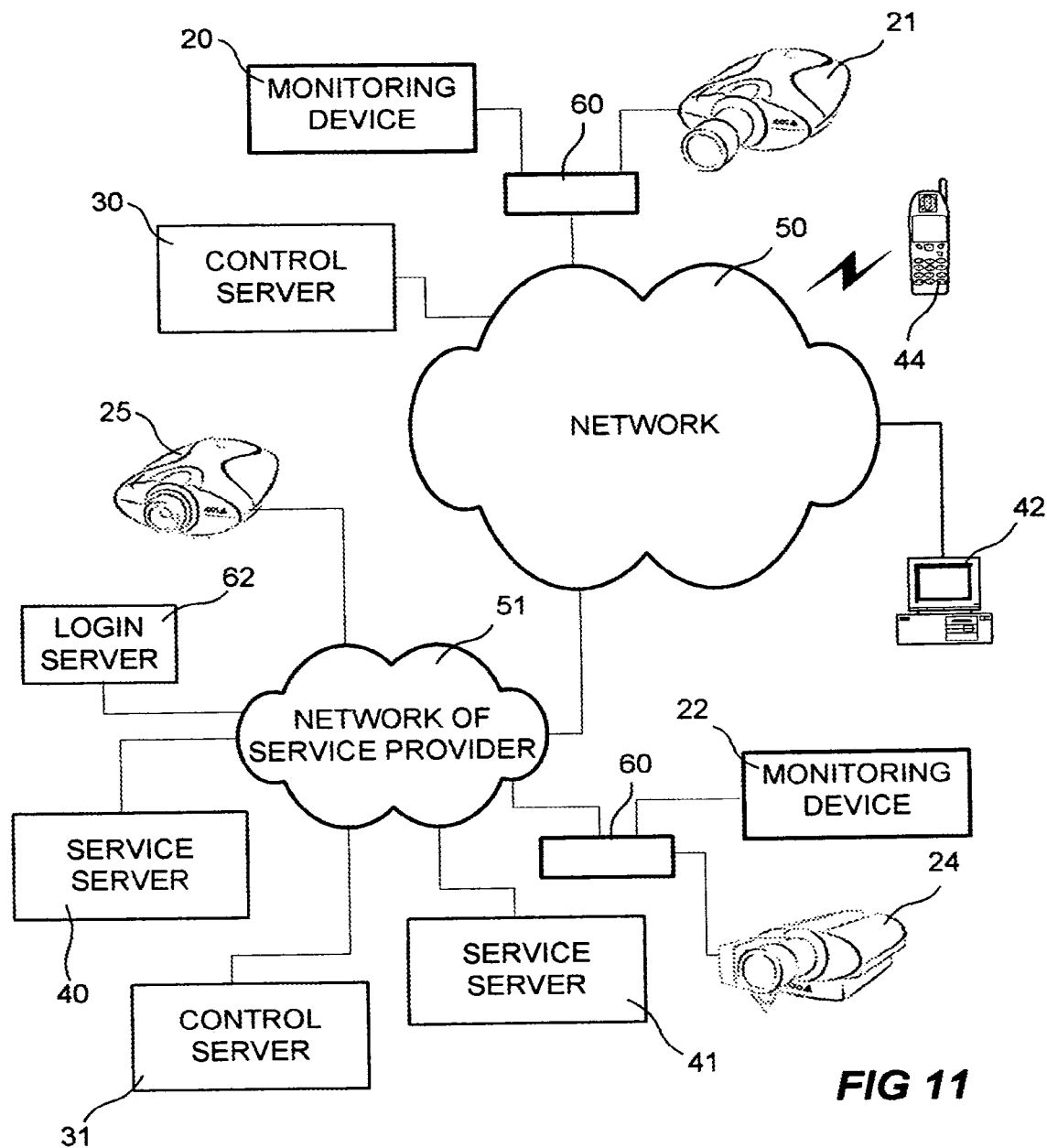
FIG. 11 is a schematic diagram over yet another configuration of a monitoring system according to the present invention.

In FIG. 11 yet another configuration of the system is presented. Let us assume that a monitoring service provider also is a provider of services such as network access, i.e. internet access. An IP-address, a portion of an IP-address, or a plurality of EP-addresses are stored in the database related to the control server 30 of the manufacturer, i.e. as much info of the IP-address or as many IP-addresses that is needed for identifying a monitoring device as being connected to a IP-address of the service provider is loaded into the database of the control server 30. The service provider is also associated with the control server 31, which is a control server operated by the service provider. The service provider have, for some reason, installed two service servers 40 and 41.

The control server 31 of the service provider is provided with a database, which is maintained by the service provider, including information relating to which one of the service servers 4041 each monitoring device 22-25 should be connected to. The information associating a monitoring device 22-25 to a service server 4041 in the control server 31 may, as above, be based on IP-addresses or it may be based on unique codes identifying the specific monitoring device. Thus, when a monitoring device 24 is connected to the network of the service provider 52 it sends a connection message to the control server 30, via the network of the service provider 52 and another network 50. The network 50 may be Internet, a LAN, a WAN, or any other network, to which the control server is connected.

The control server 30 may, for example, then match the IP-address to the service provider and the control server 31 and sends the address associated to the control server 31 to the monitoring device 24. Then, the monitoring device 24 sends a connection message to the control server 31. The control server 31 may then match the IP-address or another identifier to the service server 41 and sends the address associated to the service server 41 to the monitoring device 24. Then the monitoring device 24 sends a connection message to the service server 41 and a service connection may be established with service server 41.

The monitoring devices 25 and 22 may be associated in the same way to the service provider and the control server 31 of the service provider. However, the control server 31 may associate each of the monitoring devices 25 and 22 to any one of service servers 40 and 41 depending on the entries in the data base of control server 31. The reasons for associating a monitoring device to a specific service server may vary. One reason may be that a service provider provides some service servers for small and medium enterprises, some service servers for a more inexpensive "home solution", and some service servers for large enterprises, possibly implementing customized applications.

The two monitoring devices 20 and 21 are not connected to the common network, e.g. Internet, via the network of the service provider. These monitoring devices may anyway be associated to the service provider in the figure. For instance may the control server 30 identify the service provider to use by means of an identifier sent to the control server 30 during communication between the control server 30 and each of the monitoring device.

FIG. 11 also discloses a login server 62 connected to the network 51 of the service provider. The login server 62 is arranged to be used in an embodiment where the user provides an identity code and a user authentication code to the service provider who passes on the identity code and the user authentication code to a control server 30 together with an instruction to associate the monitoring device identified by the identity code to said service provider. The purpose of the authentication code is to prohibit unauthorized association of and access to a monitoring device. The login server 62 may be a stand alone device. However it may also be implemented in a service server 40, 41 or a control server 31 of the service provider.

Figure 12:
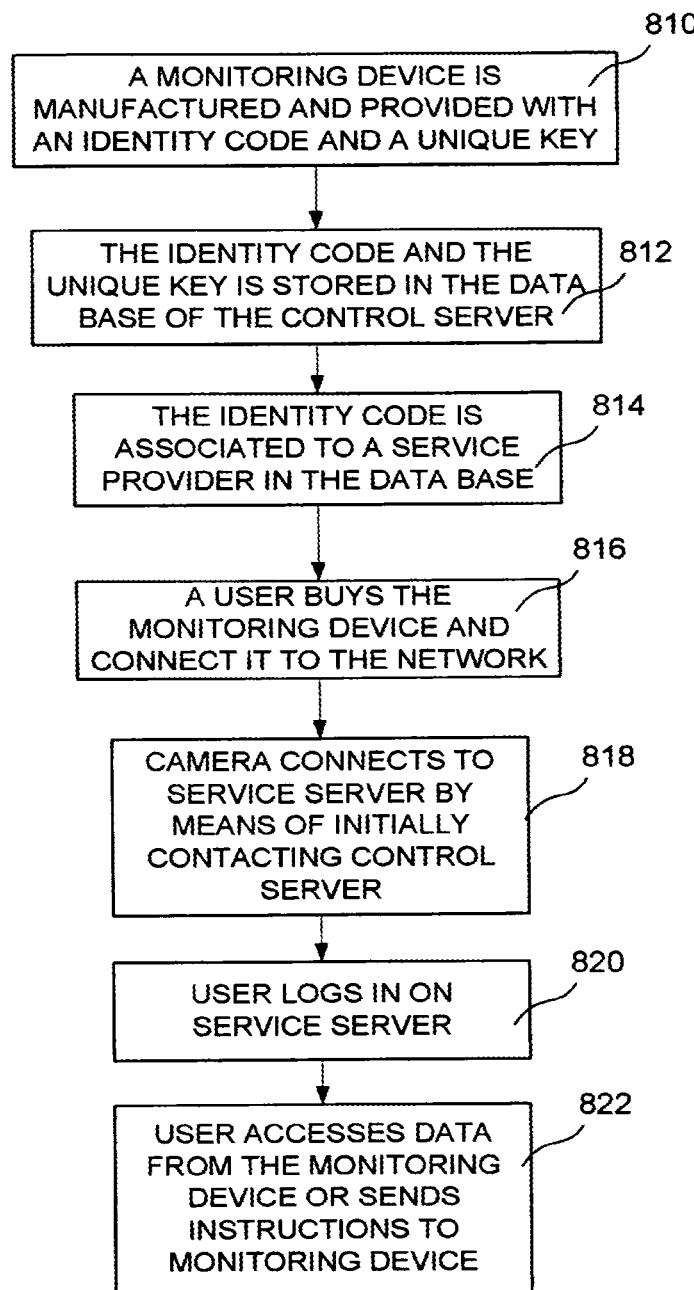
FIG. 12 is a schematic flowchart of a scenario for connecting a monitoring device to a service server and providing a user access to the monitoring device.

In FIG. 12 an example of a scenario for connecting a monitoring device to a service server and providing access for a user to the monitoring device is described. In the scenario a monitoring device is manufactured and in the manufacturing process a unique identity code and a unique key is stored in the monitoring device, step 810. The identity code and the unique key have been described earlier in the application. The manufacturer also stores the identity code and the unique key in a data base of a control server, step 812. The identity code and the unique key is then associated in the data base of the control server to an operator of an internet access or a company providing surveillance solutions, step 814. The association of the monitoring device to any of these companies may be a result of the company buying the monitoring device or a result of an agreement. Then the user buys the camera, maybe as part of a surveillance service deal with the company associated with the monitoring device, and connects it to the network, step 816. The monitoring device, the control server and the service server then performs the steps of any of the embodiments described earlier in this application and eventually creates a service connection to the service server, step 818. When the service connection is up and running the user may log in, step 820, to the service server from a user terminal by either identifying a service account or the monitoring device. The user may log in by entering user name and user authenticating code, by entering an identifier of the monitoring device combined with a user authenticating code, etc. When the user has logged in he may access data from the monitoring device stored in the service server, access live data from the monitoring device, or send instructions to the monitoring device.

Figure 13:
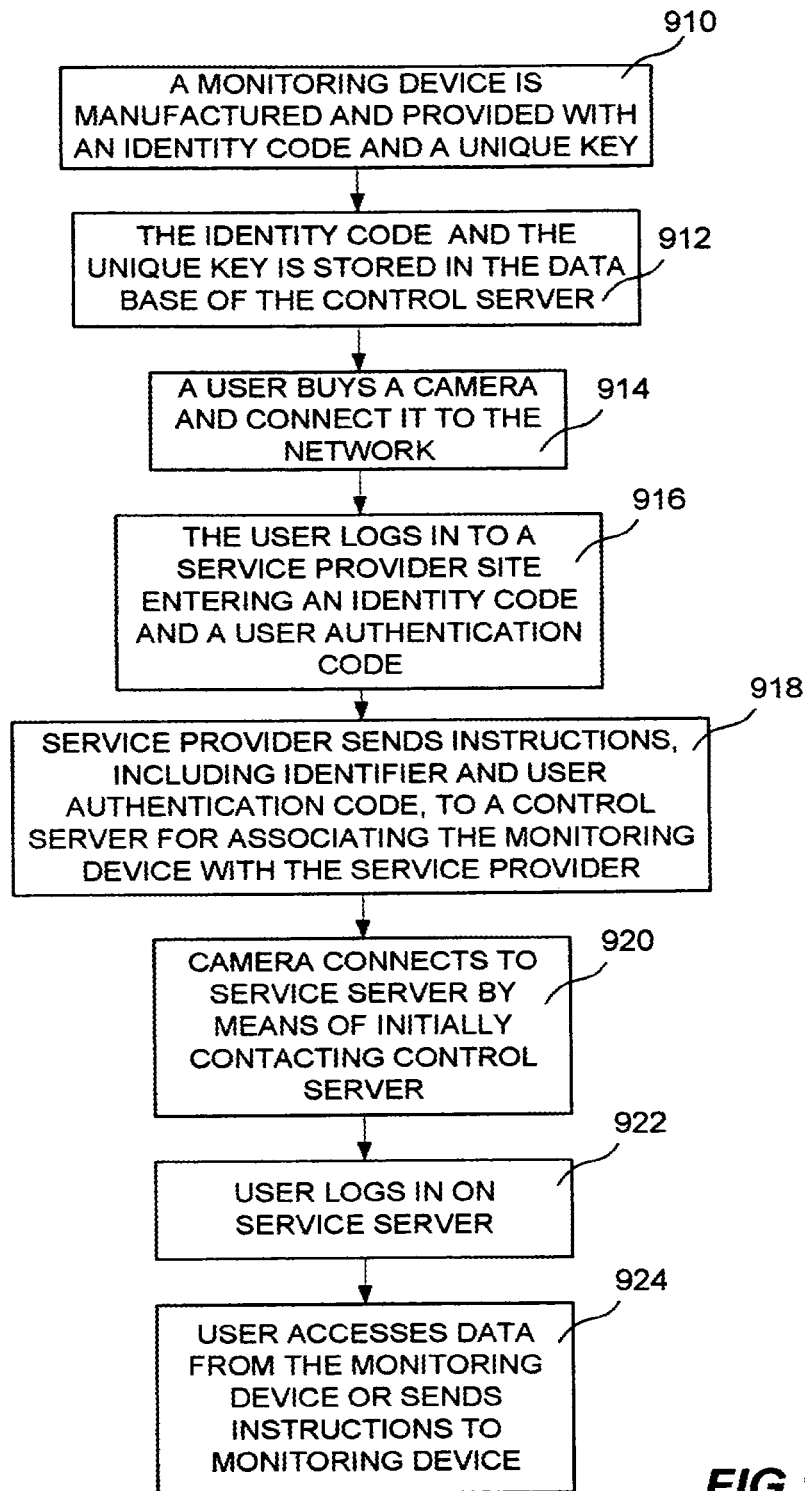
FIG. 13 is a schematic flowchart of another scenario for connecting a monitoring device to a service server and providing a user access to the monitoring device.

In FIG. 13 another example of a scenario for connecting a monitoring device to a service server and providing access for a user to the monitoring device is described. In the scenario a monitoring device is manufactured and in the manufacturing process a unique identity code and a unique key is stored in the monitoring device, step 910. The identity code and the unique key have been described earlier in the application. The manufacturer also stores the identity code and the unique key in a data base of a control server, step 912. A user buys the camera and connects it to the network, step 914. The user also logs in to a service provider site by using an identity code and a user authentication code provided with the camera, step 916. When the identity code and the user authentication code has been received by the service provider the service provider sends instructions, including the identity code and the user authentication code entered by the user, to a control server for associating a monitoring device associated with the identity code and having a key valid for the authentication code to the service provider sending the instruction, step 918. The step 914 of connecting the monitoring device to the network may be performed after the steps 916 and 918. The monitoring device, the control server and the service server then performs the steps of any of the embodiments described earlier in this application and eventually creates an service connection to the service server, step 818. When the service connection is up and running the user may log in, step 820, to the service server from a user terminal by either identifying a service account or the monitoring device. The log in may be performed by entering user name and user authenticating code, by entering an identifier of the monitoring device combined with a user authenticating code, etc. When the user has logged in he may access data from the monitoring device stored in the service server, access live data from the monitoring device, or send instructions to the monitoring device.

Figure 14:
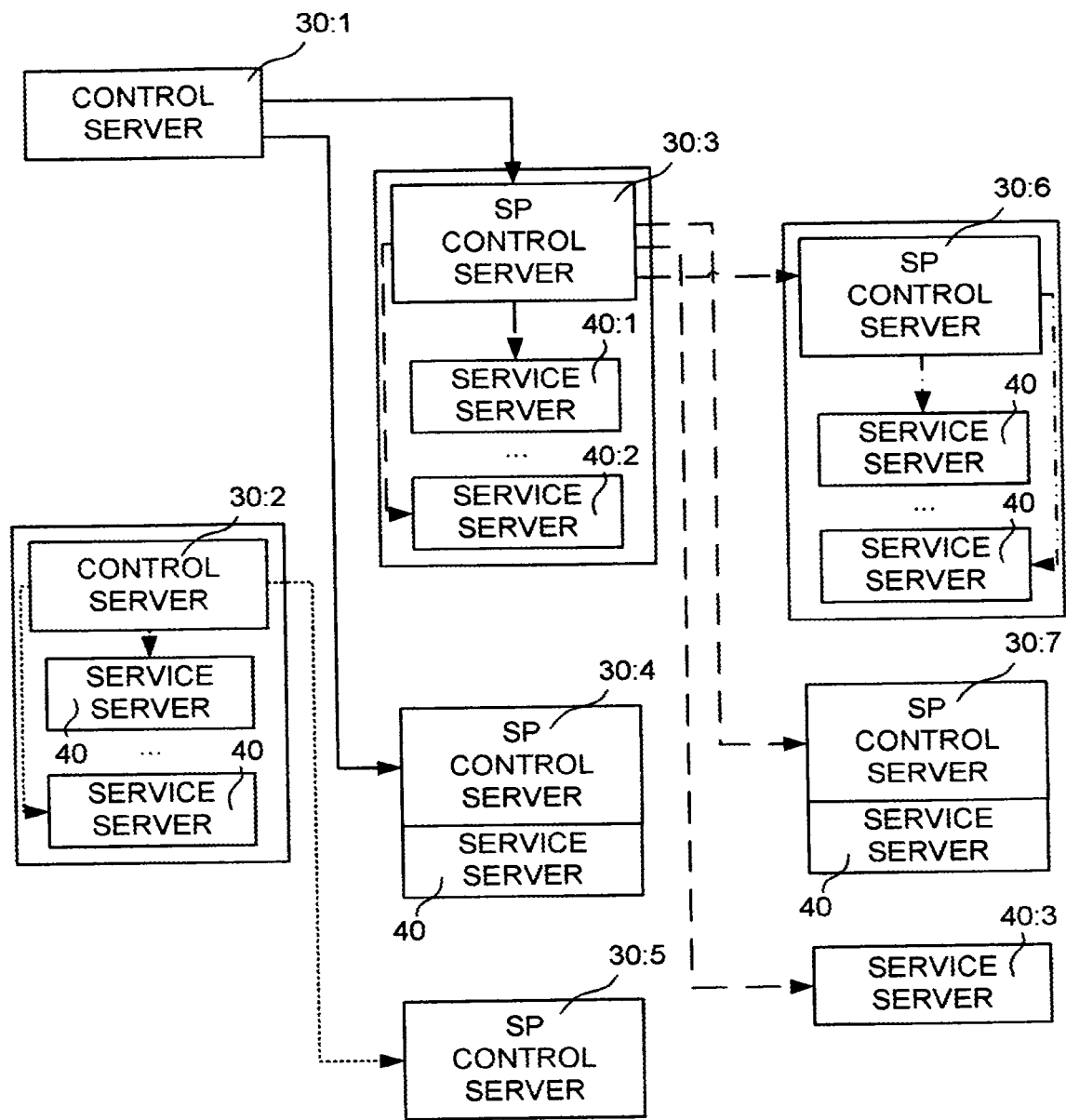
FIG. 14 is a schematic diagram over possible handover relations in a possible configuration of a monitoring system according to the invention.

In FIG. 14 an example of handovers of the monitoring device from a server to another server is shown. In the context of this application handover of the monitoring device means that a server, which is communicating with the monitoring device, provides an address to the monitoring device and that the monitoring device sends a connection message to the server at the received address and, thus, the monitoring device starts to communicate with the new server given by the previous server. In the figure each arrow indicates that the server from which the arrow originates sends the address of the server that the arrow points at to the monitoring device and the monitoring device then send a connection message to this server.

It is evident from FIG. 12 that the system of the invention may be used to implement lot of different structures, which may be easily changed if necessary. There is a limited number of servers presented in the figure for facilitating the understanding, at least some of the servers may probably include references to many more servers than is depicted in the figure.

In the example structure of FIG. 12 the system includes two initial control servers, named control server 30:1 and control server 30:2 respectively. These servers may both be initial manufacturer servers, i.e. servers having their address preprogrammed into the monitoring device during manufacture. A control server 30 may be a server arranged to act as nothing else but a control server 30 according to the present invention, e.g. control server 30:1, but a control server may as well perform other tasks simultaneously, i.e. such a control server may certainly operate as another kind of server simultaneously and for other purposes. Further, a control server may be arranged as a control server 30, as previously described, but having service servers 40 arranged at the same site, in the same room, or in the same cabinet, e.g. control servers 30:2, 30:3, and 30:6. Additionally, a control server 30 may be arranged as a combined control server 30 and a service server 40, e.g. control server 30:4, 30:7. Also an initial control server 30 may be arranged as a combined control server 30 and service server 40, not shown in the figure.

As stated above, both control server 30:1 and 30:2 may be initial control servers 30 managed by the manufacturer of the monitoring devices or any other party interested in providing the overall service and management of such a monitoring system. In order to facilitate the understanding of FIG. 14 and the function and advantages of the system a handover path from the control server will be followed. The monitoring device is automatically connected to control server 30:1 as it is installed and initiated, i.e. the address of control server 30:1 is the top priority address of the list of addresses stored in the monitoring device in connection with manufacturing of the device. In this example the database associated to the control server 30:1 only includes two entries, one entry including the address to the service provider control server 30:3 and one entry including the address to the service provider control server 30:4. Let's assume the identifier of the monitoring device is matched to the service provider control server 30:3. Then the control server 30:1 sends the address of control server 30:3 to the monitoring device and the monitoring device sends a connection message to the control server 30:3. At control server 30:3 of the service provider the identifier of the monitoring device is once more matched to entries in a database, this time a database of the service provider. The monitoring device is matched to the most suitable service server 40:1-40:3 or yet another control server 30:6-30:7, those servers are the ones available according to the handover arrows of the figure. In this example we assume the control server matches the monitoring device to the service server 40:3 and send the address of this service server to the monitoring device. Then the monitoring device and the service server establishes a service connection as described above.

The monitoring system may easily and advantageously be provided with backup servers, i.e. control servers providing redundancy in the system. Such backup servers may be implemented on all levels, i.e. both for initial control servers and for lower level control servers. The backup server may be a dedicated backup server or a control server normally serving another region or other users.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

The invention claimed is:

1. A method for configuring a monitoring device to communicate with a service server, the method comprising:
sending, by the monitoring device to a control server, a message including an identifier and a first authentication code;
authenticating, by the control server, the monitoring device using the first authentication code;
in response to authenticating the monitoring device:
identifying, at the control server, a service server associated with the identifier, wherein the service server is identified based on an identifier associated with the monitoring device;
sending, by the control server, one or more addresses of the service server to the monitoring device; and
establishing, by the monitoring device, a connection between the monitoring device and the service server using at least one of the one or more addresses received from the control server.

2. The method of claim 1, wherein the identifying includes matching the identifier to the service server by accessing a database of identifiers and associated service servers.

3. The method of claim 1, further comprising, in response to authenticating the monitoring device, sending, by the control server to the monitoring device, a reconfiguration message to update one or more programs or operating properties of the monitoring device.

4. The method of claim 1, further comprising:
retrieving, by the control server, a particular program code associated with the service server;
sending, by the control server to the monitoring device, the particular program code; and
executing, by the monitoring device, the particular program code to configure the monitoring device to establish the connection between the monitoring device and the service server.

5. The method of claim 1, further comprising:
storing, by the monitoring device, the one or more addresses of the service server; and
re-establishing, by the monitoring device, the connection between the monitoring device and the service server using at least one of the stored one or more addresses of the service server in response to the connection being disconnected.

6. The method of claim 1, further comprising:
receiving, by the monitoring device, a second authentication code from the service server, wherein the second authentication code is used for encryption; and
sending, by the monitoring device to the service server, encrypted messages over the connection between the monitoring device and the service server, wherein the encrypted messages are encrypted and decrypted using the second authentication code.

7. A method for configuring a monitoring device to communicate with a service server, the method comprising:

sending, by the monitoring device to a control server, a message including a code used for authentication of the monitoring device;

receiving, by the monitoring device from the control server, one or more addresses of a service server associated with the monitoring device in response to the monitoring device being authenticated by the control server;

storing, by the monitoring device, the one or more addresses retrieved by the control server; and establishing, by the monitoring device, a connection between the monitoring device and the service server using at least one of the one or more addresses received from the control server.

8. The method of claim 7, wherein the message includes an identifier that is used to identify the one or more addresses of the service server associated with the monitoring device from a database of identifiers and associated service servers.

9. The method of claim 7, further comprising receiving, by the monitoring device, one or more messages from the control server, wherein the one or more messages include any one or a combination of control parameters, data, and updates to one or more programs or operating properties of the monitoring device.

10. The method of claim 7, further comprising establishing, by the monitoring device, a connection with another service server after establishing the connection between the monitoring device and the service server, wherein the connection with the another service server is established in response to receiving one or more messages from the service server.

11. The method of claim 7, wherein the monitoring device is connected to the service server behind one or more access limiting devices.

12. The method of claim 7, wherein the monitoring device initiates establishing the connection between the monitoring device and the service server.

13. The method of claim 7, further comprising:

receiving, by the monitoring device, a second authentication code from the service server, wherein the second authentication code is used for encryption; and sending, by the monitoring device to the service server, encrypted messages over the connection between the monitoring device and the service server, wherein the encrypted messages are encrypted and decrypted using the second authentication code.

14. A method for configuring a monitoring device to communicate with a service server, the method comprising:

sending, by the monitoring device to a control server, a message including an identifier and a first authentication code for authentication of the monitoring device;

receiving, by the monitoring device from the control server, one or more addresses of a service server associated with the monitoring device in response to the monitoring device being authenticated by the control server, wherein the one or more addresses of the service server are associated with the monitoring device in a database and the identifier is used to identify the one or more addresses of the service server; and establishing, by the monitoring device, a connection between the monitoring device and the service server using at least one of the one or more addresses received from the control server.

15. The method of claim 14, further comprising receiving, by the monitoring device, one or more messages from the control server, wherein the one or more messages include any one or a combination of control parameters, data, and updates to one or more programs or operating properties of the monitoring device.

16. The method of claim 14, further comprising establishing, by the monitoring device, a connection with another service server after establishing the connection between the monitoring device and the service server, wherein the connection with the another service server is established in response to receiving one or more messages from the service server.

17. The method of claim 14, wherein the monitoring device is connected to the service server behind one or more access limiting devices.

18. The method of claim 14, wherein the monitoring device initiates establishing the connection between the monitoring device and the service server.

19. The method of claim 14, further comprising:

storing, by the monitoring device, the one or more addresses of the service server; and re-establishing, by the monitoring device, the connection between the monitoring device and the service server using at least one of the stored one or more addresses of the service server in response to the connection being disconnected.

20. The method of claim 14, further comprising:

receiving, by the monitoring device, a second authentication code from the service server, wherein the second authentication code is used for encryption; and sending, by the monitoring device to the service server, encrypted messages over the connection between the monitoring device and the service server, wherein the encrypted messages are encrypted and decrypted using the second authentication code.

* * * * *